United States Patent [19]

Ostroff et al.

[11] Patent Number: 4,947,022

[45] Date of Patent: Aug. 7, 1990

[54] LASER ENGRAVING METHOD

[75] Inventors: Melvin G. Ostroff, Gardner; Steven K. Ostroff, Acton, both of Mass.

[73] Assignee: Standard Chair of Gardner, Inc., Gardner, Mass.

[21] Appl. No.: 393,715

[22] Filed: Aug. 4, 1989

[51] Int. Cl.⁵ .............................................. B23K 26/00
[52] U.S. Cl. ............................ 219/121.68; 219/121.8; 219/121.82; 219/121.83
[58] Field of Search ...................... 219/121.68, 121.69, 219/121.80, 121.83, 121.82

[56] References Cited

U.S. PATENT DOCUMENTS

| 4,405,852 | 9/1983 | Bononi | 219/121.69 |
| 4,480,169 | 10/1984 | Macken | 219/121.68 |
| 4,738,602 | 4/1988 | Yamamoto et al. | 219/121.72 X |
| 7,663,793 | 5/1972 | Petro et al. | 219/121.69 |

FOREIGN PATENT DOCUMENTS 0191687  9/1985  Japan .............................. 219/121.78

Primary Examiner—C. L. Albritton
Attorney, Agent, or Firm—Samuels, Gauthier & Stevens

[57] ABSTRACT

A workpiece having a curved surface is laser engraved by being manipulated in a single plane while maintaining the focal point of the laser beam at a plane corresponding to the average working distance between the surface being engraved and the laser's focusing lens.

6 Claims, 2 Drawing Sheets

LASER ENGRAVING METHOD

BACKGROUND OF THE INVENTION

1. Field of the Invention

This invention relates generally to laser engraving, and is concerned in particular with an improved method of laser engraving bent chair crowns and the like.

2. Description of the Prior Art

Laser engraving is now a well known and widely practiced technique. Turnkey laser systems, such as for example the LASER GRAVER marketed by Laser Machining, Inc. of Somerset, Wis., are now in commercial operation. Such systems optically scan a design depicted by black and white art work and simultaneously engrave the design, using a laser beam, into a variety of materials.

Those skilled in the laser engraving art are familiar with the fact that the depth and shape of the laser cut is dependent to a large extent on the position of the focal point of the laser beam relative to the work surface. Thus for example, when drilling holes, if the focal point is located above the work surface, shallow holes of large diameter and with somewhat tapered sides are produced. When the focal point is located at the work surface, deeper holes of uniform diameter are drilled. When the focal point is located below the work surface, shallower holes are again drilled with conical sides.

Because of this phenomenon, laser engraving has been mainly restricted to applications where the work surface is kept at a constant working distance from the laser's focusing lens, which makes it possible to maintain the focal point of the laser beam at the work surface. Thus, cylindrical surfaces such as those of printing cylinders are engraved by being rotated about their axes, whereas flat surfaces on commemorative plaques and the like are shifted to and fro while being incrementally indexed in a single plane. Insofar as we are aware, however, no one has attempted to laser engrave partially cylindrical or curved workpieces, such as for example bent chair crowns.

This is probably because it has been thought necessary to maintain the focal point of the laser beam at the work surface in order to achieve an engraving of acceptable quality. To do so with a partially curved or bent workpiece would require complex manipulating devices and time consuming setup procedures, making the process prohibitively expensive, particularly for limited production lots or customized applications.

SUMMARY OF THE INVENTION

The present invention is based on the discovery that engravings of acceptable quality can be achieved on partially curved or bent surfaces by manipulating the workpiece in a single plane while maintaining the focal point of the laser beam at the average working distance between the laser's focusing lens and the surface being engraved.

The resulting laser engraved image is characterized by zones of varying crispness, the variations being nearly imperceptible to the naked eye, with the overall effect being substantially consistent and entirely acceptable.

DESCRIPTION OF ILLUSTRATED EMBODIMENT

Figure 1:
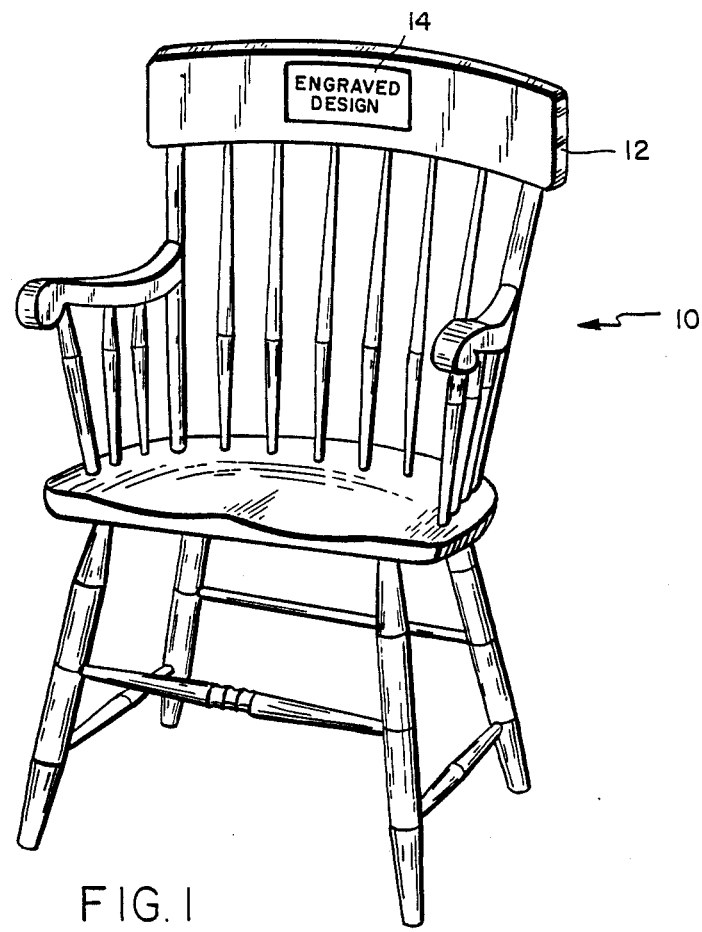
FIG. 1 is a perspective view of a chair having a design laser engraved into the concave surface of the bent chair crown.

Referring now to the drawings, FIG. 1 illustrates a typical chair 10 having a bent crown 12. The present invention is primarily concerned with, although not limited to, the laser engraving of a design 14 onto a curved surface of the crown.

Figure 2:
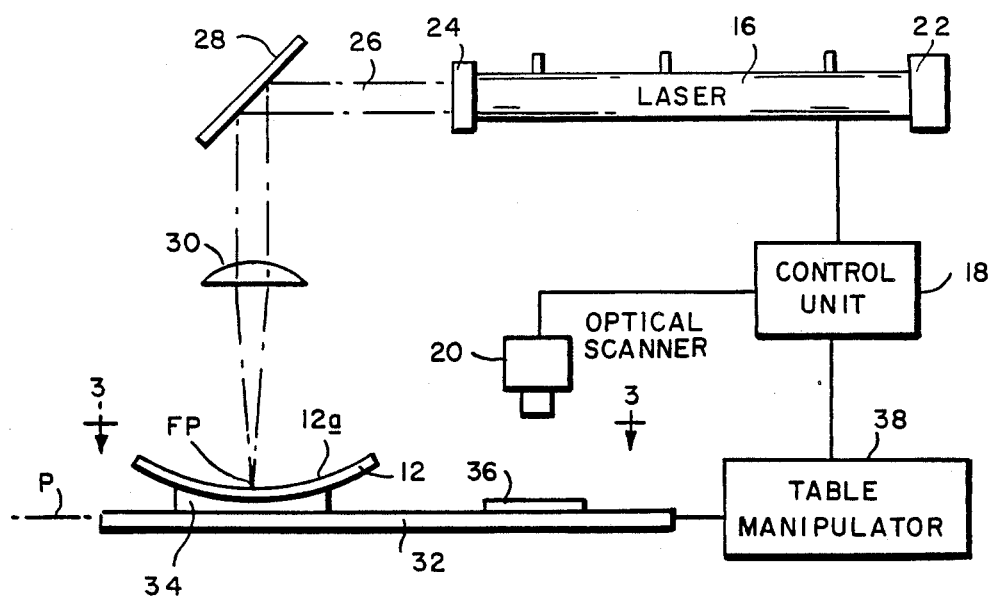
FIG. 2 is a diagrammatic illustration of a laser engraving apparatus which may be employed in accordance with the method of the present invention.
Figure 3:
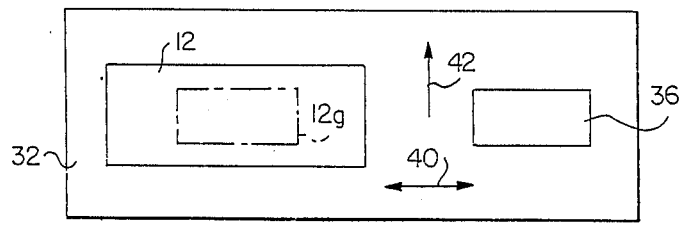
FIG. 3 is a plan view taken at line 3-3 of FIG. 2.

FIGS. 2 and illustrate a typical laser engraving apparatus which can be operated in accordance with the present invention. The apparatus includes a laser tube 16 which is energized via a control unit 18 also connected to an optical scanner 20.

The laser tube 16 has a slightly concave back mirror 22 and a front mirror 24, the latter having partial transmittance to allow an intense light beam 26 to pass therethrough. The beam 26 is reflected by a 45° angle mirror 28 and is directed downwardly to a focusing lens 30 which further concentrates the light and increases its intensity by focusing it at a focal point FP.

The lens 30 and the optical scanner 20 overlie a worktable 32. A fixture 34 supports the chair crown 12 beneath the lens 30, and a sheet 36 showing a black and white illustration of the design to be engraved is also supported on the table. The table 32 is mechanically connected to a manipulator 38 which is controlled by the control unit 18. The manipulator operates to reciprocate the table to and fro in the direction of arrow 40 while incrementally advancing the table in the direction of arrow 42, both movements occurring in a single plane P.

During a laser engraving operation, the table manipulator 38 imparts movement to the table in the directions 40,42. As the table moves, the scanner 20 scans the artwork on sheet 36 and, through the control unit 18, turns the laser beam 26 on and off—for example, on when the scanner sees black and off when the scanner sees white, or vice versa. The focused laser beam engraves the design onto the upwardly facing surface 12a of the crown 12.

Figure 4:
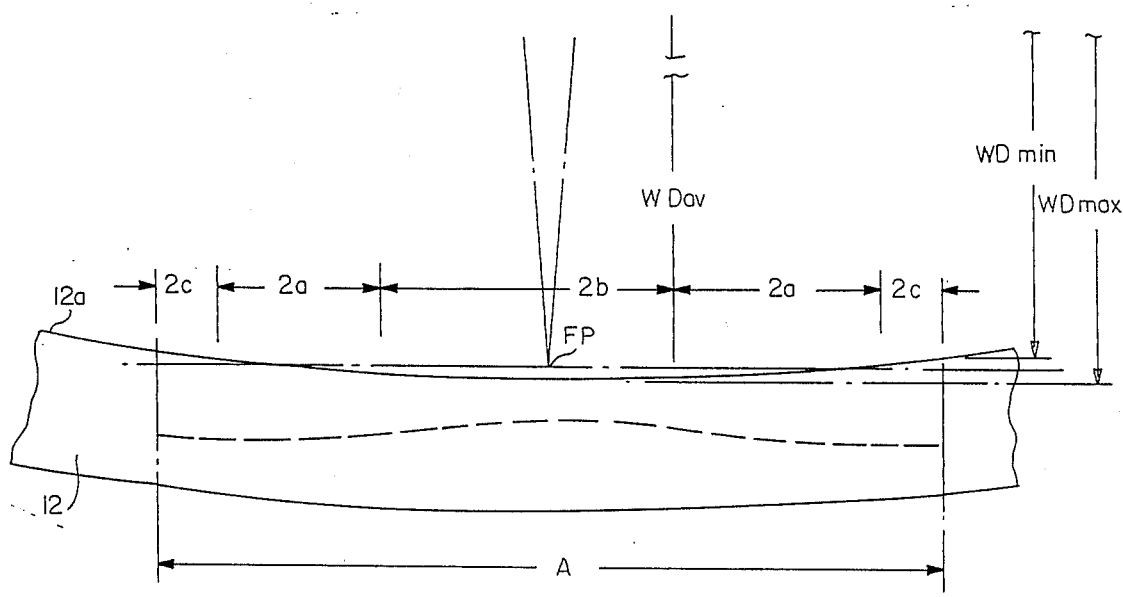
FIG. 4 is an enlarged diagrammatic illustration showing the adjustment of the laser beam's focal point in relation to a curved surface onto which an image is to be engraved.
Figure 5:
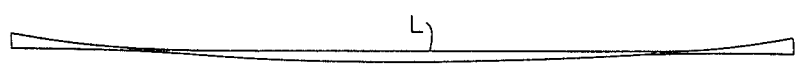
FIG. 5 is a plan view of a laser engraved line, with width dimensions exaggerated for illustrative purposes.

In accordance with the present invention, and with further reference to FIGS. 4 and 5, the maximum and minimum working distances $WD_{max}$, $WD_{min}$ between the focusing lens 30 and the surface 12a are measured within the area A to be engraved. The average working distance $WD_{av}$ is then calculated, and the lens 30 is adjusted to set the focal point FP of the laser beam at the plane of the average working distance $WD_{av}$. For a bent chair crown 12 having a partially cylindrical surface 12a, the average working distance $WD_{av}$ would be half the sum of the maximum and minimum working distances $WD_{max}$, $WD_{min}$. The entire laser engraving operation is then carried out at this setting. Thus, as the table 32 and crown 12 supported thereon reciprocate in the direction 40, the focal point FP will shift between positions slightly above, at, and slightly below surface 12a within the area A being engraved.

With reference to FIG. 5, it will be seen that as the focal point FP undergoes vertical shifting with respect to surface 12a, the width of a lasered line L will experience corresponding variations, with the narrowest or "sharpest" regions being cut where the focal point is in closest proximity to the surface 12a (either above or below). Thus, and with reference to FIG. 4, the resulting engraved design will have zones $Z_a$ which are relatively sharp and crisp as compared to zones $Z_b$ and $Z_c$. However, the variations between zones is nearly imperceptible to the naked eye, and the resulting engraved design is substantially uniform and of entirely acceptable quality. This result is achieved without resorting to complex manipulating apparatus, and with a minimum set up time.

We claim:

1. An article of manufacture having a curved surface with a design laser engraved thereon, said design having varying line widths and depths resulting from a shifting of the focal point of the laser beam between positions above, at and below said surface.

2. For use with an engraving apparatus of the type having a workable underlying both the focusing lens of a laser and an optical scanner, the worktable being adapted to locate a non-planar surface area of a work piece beneath the focusing lens and to also locate art work displaying a design beneath the optical scanner, the work table being movable in a single plane to expose said surface area to a laser beam emanating from the focusing lens of the laser and the laser being operable in response to signals generated by the optical scanner scanning the art work to engrave said design on said surface area, an improved method of operating said apparatus comprising:

(a) adjusting said lens to set the focal point of the laser beam at a reference plane passing through said surface area, with some of said surface area lying above said plane and with the remainder of said surface area lying below said plane; and
   (b) carrying out the entire laser engraving process while maintaining the focal point of the laser beam at said plane.

3. The method of claim 2 wherein said reference plane is at the average working distance between said lens and said surface area.

4. The method of claim 3 wherein the surface area is partially cylindrical, and wherein the average working distance is one-half the difference between the maximum and minimum working distances between said surface area and said lens.

5. The method of claim 4 wherein the work piece is the bent crown of a chair back.

6. The method of claim 2 wherein during the engraving process the focal point of the laser beam shifts between positions above, at and below said surface area.

* * * * *